3,543,057
AC PROBE FOR LOW VOLTAGE LINEAR TRACKING
James M. Colwell, Loveland, and Paul F. Febvre, Fort Collins, Colo., assignors to Hewlett-Packard Company, Palo Alto, Calif., a corporation of California
Filed Sept. 6, 1967, Ser. No. 665,918
Int. Cl. H03k 19/12
U.S. Cl. 307—317                2 Claims

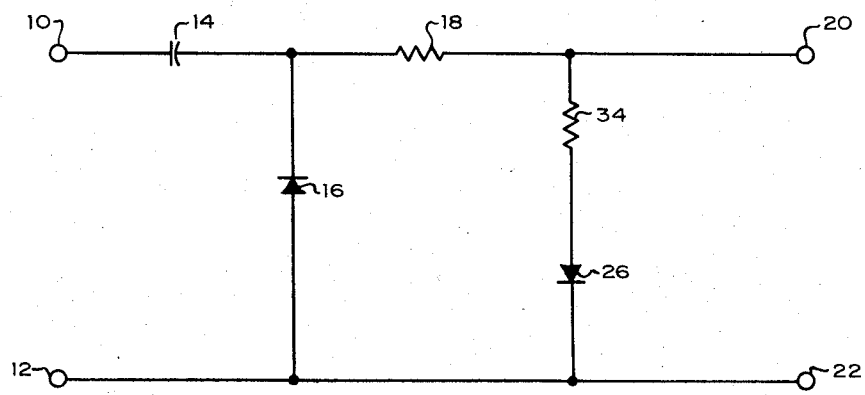
INVENTORS
JAMES M. COLWELL
PAUL F. FEBVRE
ATTORNEY

United States Patent Office 3,543,057
Patented Nov. 24, 1970

ABSTRACT OF THE DISCLOSURE

An AC voltmeter probe has a nonlinear device connected across the AC input and a similar nonlinear device connected across the DC output to compensate for the nonlinearity of the first device and thus provide DC output which remains accurately proportional to the AC input.

BACKGROUND OF THE INVENTION

Certain existing AC voltmeter probes give a DC output signal which is nonlinearly related to the AC input signal when the AC input is a low voltage signal. The nonlinear characteristic curve of the probe is due to the nonlinearity of the characteristic curve of the detection diode. Heretofore this error in AC probes has been compensated for by the use of a corresponding separate nonlinear scale. The use of such a scale is an undesirable solution because the scale must be calibrated to each individual diode and such nonlinearly calibrated scales are difficult to read as the divisions are not evenly spaced.

SUMMARY OF THE INVENTION

The present invention is a divider circuit connected across the detection diode and includes a diode similar to the detection diode which is connected to conduct in a direction opposite to the conduction direction of the detection diode.

DESCRIPTION OF THE PREFERRED EMBODIMENT

Referring to the drawing which shows an AC voltmeter probe circuit, points 10 and 12 are the input terminals, and points 20 and 22 are the output terminals. A capacitor 14 is connected between the input terminal 10 and the cathode of a detector diode 16. The anode of the detector diode is connected to the input terminal 12. The divider circuit comprises a resistor 18 connected from the cathode of the detector diode to the output terminal 20, and a resistor 34, connected in a series with a second diode 26 across the output terminals 20 and 22. The cathode of the compensator diode 26 is connected to output terminal 22 and its anode is connected to the resistor 34, the other terminal of the resistor 34 is connected to the output terminal 20.

The input of the divider circuit is the signal which is passed by the detector diode. This signal is influenced by the characteristic curve of the detector diode which is nonlinear at low voltages. The nonlinear characteristic of the detector diode is compensated for by connecting a compensator diode in the divider circuit to alter the signal division ratio of the divider circuit at low input signal levels. This gives the probe a linear DC output voltage over a wide range of AC input voltage.

We claim:
1. A signal circuit comprising:
   a pair of input terminals for receiving an applied alternating signal;
   a first diode having anode and cathode electrodes;
   a capacitor;
   the first diode and said capacitor being serially connected across said input terminals for conducting current therethrough only on half cycles of applied alternating signals of one polarity;
   a series circuit direct-current connected to the anode and cathode electrodes of said first diode to receive only the signal appearing across said first diode, said series circuit including resistive means and a second diode which conducts only the current in said series circuit and which is poled to conduct current therethrough only on signal having polarity opposite the polarity of signal on which said first diode conducts; and
   a pair of output terminals direct-current connected to receive the signal appearing across said second diode for producing a direct-current output signal representative of the applied alternating signal.
2. A signal circuit as in claim 1 wherein:
   said resistive means includes a pair of resistors serially connected with said second diode; and
   said output terminals are connected to receive only the signal appearing across the series combination of the second diode and an adjacently connected resistor.

References Cited
UNITED STATES PATENTS

| | | | |
|---|---|---|---|
| 2,916,618 | 12/1959 | Adams et al. | 307—317 XR |
| 3,023,355 | 2/1962 | Thorsen | 307—317 XR |
| 3,197,701 | 7/1965 | Sangl et al. | 324—131 XR |

OTHER REFERENCES

RCA Technical Note (No. 276) titled, "Linear Small Signal Detector," written by William N. Moule, dated June 1959.

STANLEY T. KRAWCZEWICZ, Primary Examiner

U.S. Cl. X.R.
324—119, 132; 328—171